United States Patent [19]

Spector

[11] Patent Number: 4,875,142
[45] Date of Patent: Oct. 17, 1989

[54] BICYCLE SAFETY LIGHTS

[76] Inventor: Donald Spector, 380 Mountain Rd., Union City, N.J. 07087

[21] Appl. No.: 846,892

[22] Filed: Apr. 1, 1986

[51] Int. Cl.⁴ .............................. B62J 6/00; F21L 7/00
[52] U.S. Cl. ..................................... 362/72; 362/202; 362/205
[58] Field of Search ................. 362/72, 202, 205, 208, 362/203

[56] References Cited

U.S. PATENT DOCUMENTS

| | | | |
|---|---|---|---|
| 2,225,936 | 12/1940 | Williams | 362/208 |
| 2,249,689 | 7/1941 | Gelardin | 362/203 |
| 2,249,690 | 7/1941 | Gelardin | 362/203 |
| 2,469,944 | 5/1949 | Bauters | 362/72 |
| 2,483,665 | 10/1949 | Phillips | 362/203 |
| 2,500,364 | 3/1950 | Kopp | 362/202 |
| 2,603,701 | 7/1952 | Schadel, Jr. | 362/72 |
| 2,793,284 | 5/1957 | Simoneit | 362/72 |
| 3,532,875 | 10/1970 | Keller | 362/203 |
| 4,484,253 | 11/1984 | Roberts | 362/205 |
| 4,495,551 | 1/1985 | Foltz | 362/208 |

Primary Examiner—Raymond A. Nelli
Attorney, Agent, or Firm—Michael Ebert

[57] ABSTRACT

Self-contained starboard and port light units that are receivable in the back-swept hollow arms of a bicycle handlebar to provide blinking light signals that are highly visible to drivers of vehicles to the rear of the bicyclist. Each unit includes a tubular battery case adapted to wedge into a handlebar arm. The open front end of the case projects from the arm and has an edge contact thereon that is connected to the base pole of the battery whose center pole is exposed at the front end of the case. Coupled to the front end of the case is a rotatable beacon assembly formed by a lens and a cylindrical mounting therefor within which is a light bulb whose center terminal engages the center pole of the battery and whose base terminal is connected to a movable switch contact that only engages the edge contact on the case when the rotatable assembly is caused to assume a particular angular position. The light bulb incorporates a thermostatic interrupter to effect intermittent energization thereof.

7 Claims, 2 Drawing Sheets

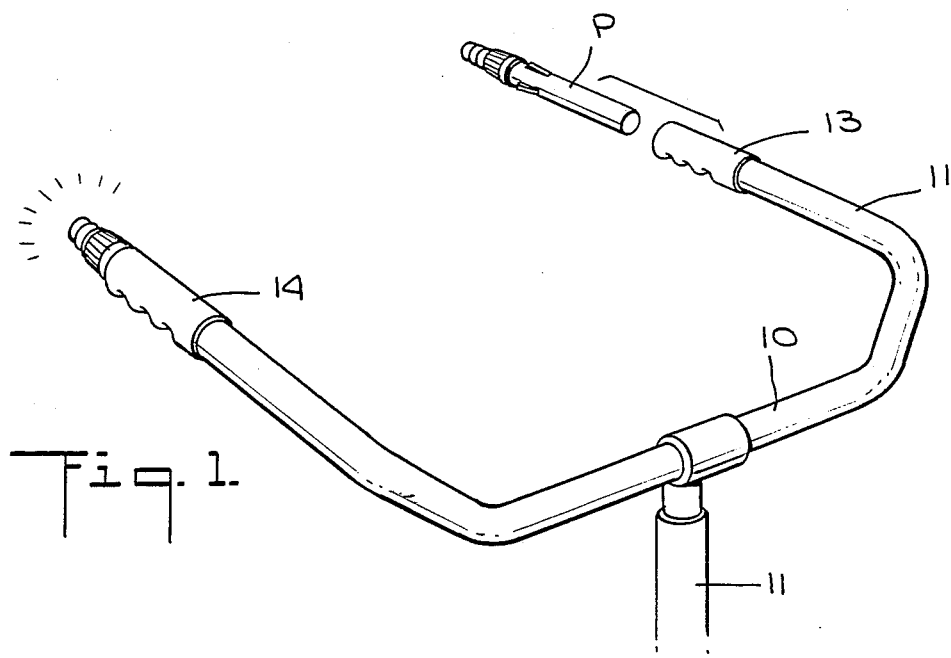
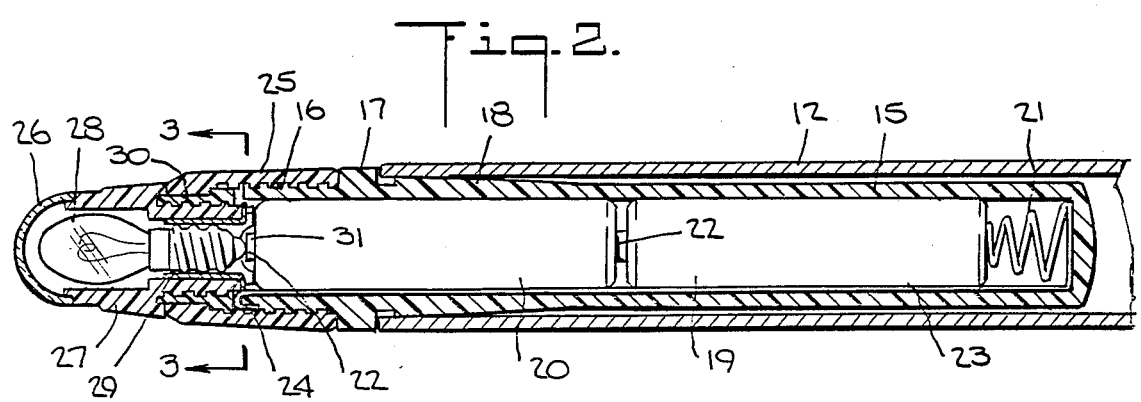
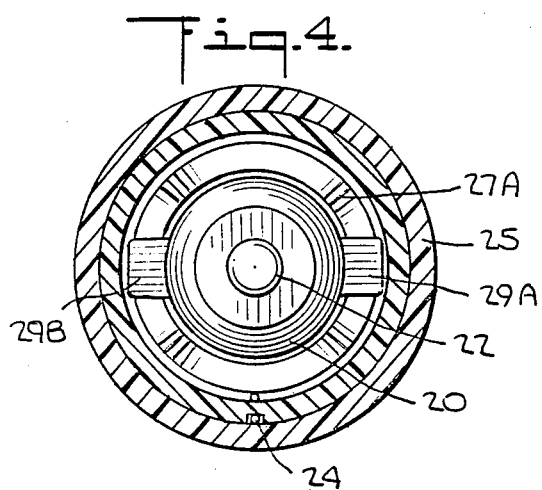
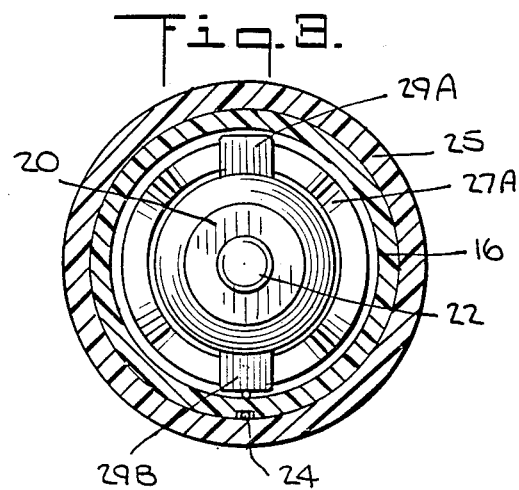

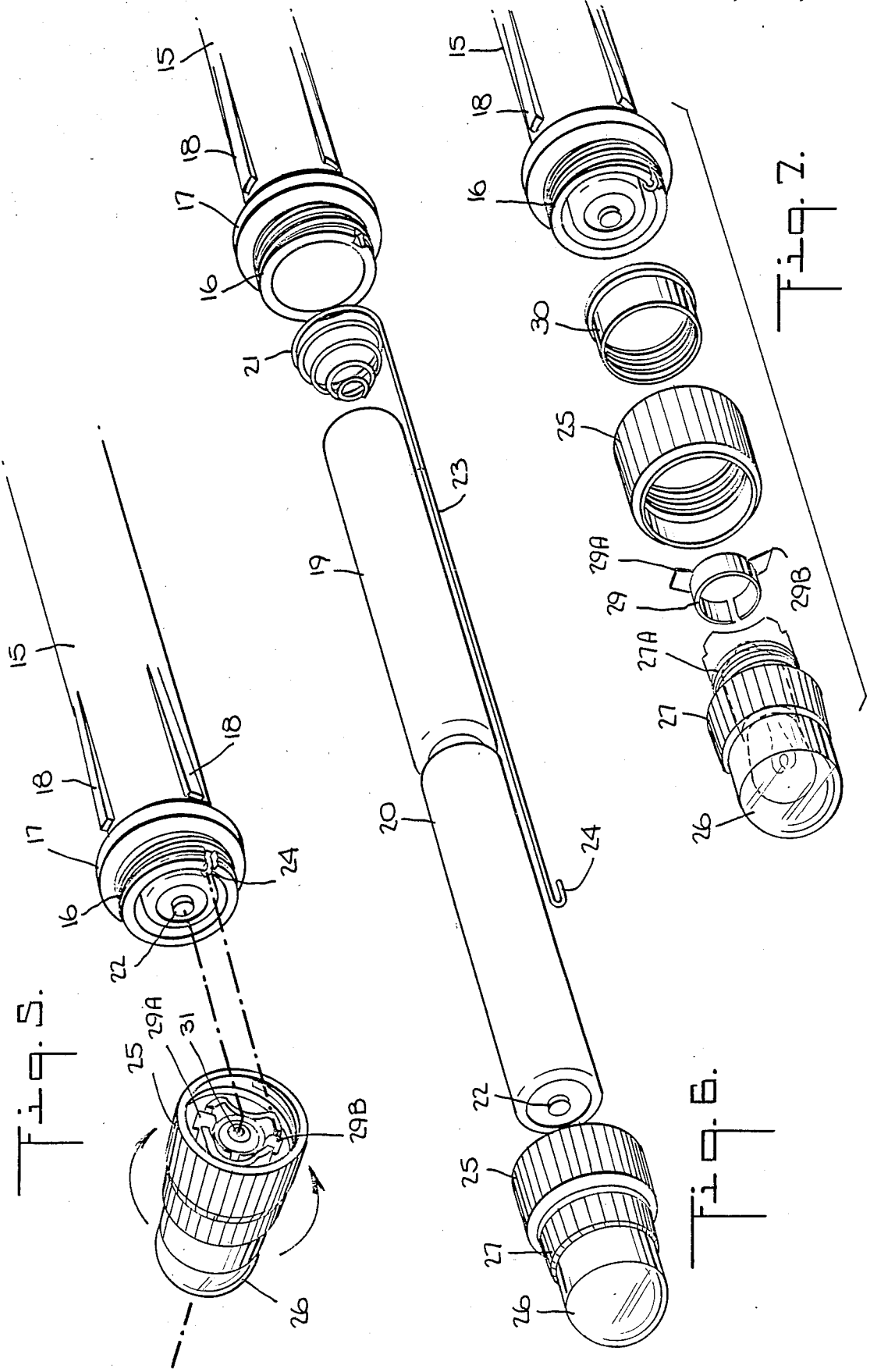

BICYCLE SAFETY LIGHTS

BACKGROUND OF INVENTION

1. Field of Invention

This invention relates generally to safety lights for bicycles, and more particularly to self-contained starboard and port light units receivable in the back-swept hollow arms of a bicycle handlebar to provide blinking light signals that are highly visible to drivers of vehicles to the rear of the bicyclist.

2. Status of Prior Art

Bicycle accidents occur with a high degree of frequency particularly at night, for bicycle riders often share the same roads with vehicular traffic. A bicycle is a relatively small vehicle that in terms of visible structure is virtually two-dimensional; for its transverse dimension is defined only by the handlebars. Hence, it is normally quite difficult for car drivers to see and avoid bicyclists. It is for this reason that all bicycles are equipped at their rear with prism-type reflectors.

The problem with a prism-type reflector is two-fold; for not only is its normal placement below the seat of the bicycle and therefore not easily discernible to a driver of a vehicle behind the bicyclist, but it is not optically activated unless the headlight beam of the vehicle directly strikes the reflector. Thus, a prism-type reflector on a bicycle is often not seen by car drivers.

In order, therefore, to provide more effective safety signals, it is known to equip bicycles with lights that are battery operated. And instead of placing these lights on the frame of the vehicle, it is known in the prior art to mount them on the swept-back hollow arms of the bicycle handlebars, so that the driver in a car behind the vehicle will see lights on either side of the seated bicyclist and in this way gain a better impression of the presence of a bicycle.

The difficulty with known types of handlebar bicycle lights is that since they are battery powered, it necessary to wire the light bulbs to a battery pack mounted on the bicycle frame. To this end, the wires are usually threaded through the handlebar arms and pass through bores in the handlebar to the battery pack. One cannot, therefore, readily retrofit handlebar lights on an existing bicycle, and it is for this reason that the installation of handlebar lights is normally carried out at the factory.

It is also necessary with known types of bicycle lights to provide switches for the lights. These switches may be difficult to manipulate when the bicyclist is pedaling his bicycle and has his hands on the handlebar.

SUMMARY OF INVENTION

In view of the foregoing, the main object of this invention is to provide self-contained light units that are receivable in the swept-back hollow arms of a bicycle handlebar to provide light signals that are highly visible to drivers of vehicles to the rear of the bicyclist.

A significant advantage of the invention is that it does away with the need for a separate battery pack which has to be attached to the frame of the bicycle. And it also dispenses with the need to wire the handlebar lights to the battery pack. A unit in accordance with the invention, because it is self-sufficient, may be installed in existing bicycles rather than at the factory.

More particularly, an object of the invention is to provide units of the above type which generate differently colored blinking light signals that function effectively as starboard or port lights.

Also an object of the invention is to provide a unit of the above type which incorporates a switch that is easily manipulated while the bicyclist is pedaling his bicycle and has his hands on the handlebar.

Still another object of the invention is to provide units of the above type which can be manufactured at a low cost, not exceeding the cost of a conventional flashlight.

Briefly stated, these objects are attained in self-contained starboard and port light units that are receivable in the back-swept hollow arms of a bicycle handlebar to provide blinking light signals that are highly visible to drivers of vehicles to the rear of the bicyclist. Each unit includes a tubular battery case adapted to wedge into a handlebar arm. The open front end of the case projects from the arm and has an edge contact thereon that is connected to the base pole of the battery whose center pole is exposed at the front end of the case. Coupled to the front end of the case is a rotatable beacon assembly formed by a lens and a cylindrical mounting therefor within which is a light bulb whose center terminal engages the center pole of the battery and whose base terminal is connected to a movable switch contact that only engages the edge contact on the case when the rotatable assembly is caused to assume a particular angular position. The light bulb incorporates a thermostatic interrupter to effect intermittent energization thereof.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a bicycle handlebar having installed thereon self-contained starboard and port light units in accordance with the invention;

FIG. 2 is a longitudinal section taken through one arm of the handlebar and through the light unit installed therein;

FIG. 3 is a transverse section taken in the plane indicated by line 3—3 in FIG. 2 in the active mode of the unit in which the light is switched "on";

FIG. 4 is the same section as in FIG. 3, but with the unit in the inactive mode;

FIG. 5 shows the relationship between the case of the unit and the beacon assembly;

FIG. 6 shows the batteries removed from the case and the relationship between the battery spring and the negative terminal of the unit; and FIG. 7 is an exploded view of the beacon assembly.

DESCRIPTION OF INVENTION

Referring now to FIG. 1, there is shown a conventional bicycle handlebar 10 formed of metal tubing mounted on the steering post 11 of the bicycle. Handlebar 10 includes swept-back left and right hollow arms 11 and 12 of uniform diameter. Fitted over the ends of these arms are handgrip sleeves 13 and 14.

Receivable in left arm 11 is a self-contained port light unit P which is shown removed from the arm. Received in right arm 12 is a self-contained starboard light unit S. The two units P and S are identical except that the port unit P produces a blinking red light and the starboard unit S a blinking green light.

This arrangement is comparable to the red and green port and starboard lights on a vessel (or aircraft), for such lights not only indicate the breadth of the ship but also its direction of movement. The starboard side is the right side looking forward. Hence, if one is at a given position relative to the vessel and sees the starboard light at his right, he knows the ship is moving away from him; but if he sees the starboard light at his left, he knows the ship is approaching.

As shown in FIGS. 2 and 5, each unit includes molded plastic tubular case 15 that is closed at its bottom end and has an externally-threaded open front end 16. Case 15 is provided with an annular rim 17 that lies behind the front end 16 so that when the case is inserted in a handlebar arm (12 or 13), the rim rests against the edge of the arm whereby the front end 16 then projects from the arm.

As best seen in FIGS. 5 and 6, formed on the exterior of case 15 at spaced circumferential positions is an array of ribs 18 which are tapered to create wedges. When the case is inserted in a hollow arm, these wedges frictionally engage the inner surface of the arm (see FIG. 2) and serve to hold the case securely in place. Thus, once the case is pushed into an arm, it remains therein unless forcibly extracted.

Received in case 15 are two small A—A battery cells 19 and 20 in series which together provide a 3-volt output appropriate to a typical flashlight type bulb. Each battery, as is conventional, has a negative base pole formed by its metal casing, and a positive pole which is the center terminal 22 at the top end of the cell.

The bottom pole of battery 19 is engaged by a compressible metal spring 21 (see FIGS. 2 and 6) having a straight wire extension 23 that runs along the inner wall of the case and terminates in a crook 24 that hooks onto the front edge of the case to form the fixed contact of a switch for connecting the batteries to the light bulb.

Coupled to the front end 16 of case 15 by means of a union 25 is a beacon assembly formed by a dome-shaped plastic lens 26 and an opaque plastic cylindrical mounting 27 therefor having an externally-threaded shank 27A. Received within mounting 27 is a filamentary light bulb 28 of the type which incorporates a thermostatic interrupter so that when the bulb is energized and heats up, this heat causes the thermostatic or bimetallic element to disconnect the filament from the power. As a result of this action, the de-energized bulb cools until a point is reached where the thermostatic element again operates to apply power to the filament. This on-off cycle is repeated, so that the bulb provides a blinking rather than a continuous light.

The base terminal of bulb 28 is engaged by a metal clamping collar 29 (see FIG. 7) having a pair of opposed lugs 29A and 29B which lie within recesses in the end of shank 27A to define the movable contacts of the switch. The beacon assembly is secured to union 25, but is free to rotate, this being effected by an internally-threaded coupling ring 30 which is telescoped within union 25 and is screwed onto shank 27A of the lens mounting.

When, as shown in FIGS. 2 and 5, the beacon assembly is coupled by union 25 to battery case 15, then the center terminal 31 of light bulb 28 is in engagement with the center positive pole of front battery 20, this connection being maintained by spring 21 which urges battery 20 toward the bulb. To complete the connection between the batteries and the bulb, the fixed contact 24 on the case must be engaged by either movable contact 29A or 29B on the beacon assembly. This switching action is effected by turning the beacon assembly in either direction so that at a given angular position either contact 29A or contact 29B engages fixed contact 24.

The plastic lens of the starboard unit S has a green hue and that of the port unit P has a red hue, so that the blinking green and red light signals are produced which are clearly visible to drivers of vehicles behind the bicyclist. Miniature dry batteries have a limited life; hence these units should be turned "ON" only when necessary. To do this, the bicyclist has merely to turn the beacon assembly a few degrees to effect a switching "ON" action, and to reverse turn the assembly to effect an "OFF" action. Since the bulb is intermittently energized, this reduces the drain on the batteries and also provides a blinking light signal which gains greater attention than a continuous light.

Should the bulb burn out, there is no need to disassemble the unit to replace the bulb, for the bulb is trapped within the beacon assembly; and to replace a bulb, one has only to unscrew the union from the case; and to replace the entire beacon assembly, the case remaining in the handlebar arm.

While there has been shown and described a preferred embodiment of bicycle safety lights in accordance with the invention, it will be appreciated that many changes and modifications may be made therein without, however, departing from the essential spirit thereof. Thus, the invention is not limited to a two-battery unit, and in practice may be realized by a single-battery unit. The battery in this instance is preferably a lithium battery whose power capacity and effective life is much longer than that of a conventional alkaline cell.

I claim:

1. Self-contained starboard and port light units receivable in the back-swept hollow, open-ended arms of a bicycle handlebar to provide light signals hat are highly visible to drivers of vehicle to the rear of the bicyclist, each unit comprising:
   A. a tubular battery case molded of synthetic plastic material having exterior wedging means constituted by tapered ribs forming wedging elements adapted to wedge the case into a handlebar arm, whereby the case is securely held therein, said case having a front end that projects from the open end of the arm;
   B. at least one cylindrical battery cell in said case whose positive pole is exposed at the front end of the case, and whose negative pole is connected to a fixed switch contact at the end of the front end of the case; and
   C. a rotatable beacon assembly removably coupled to the front end of the case, said assembly including a tubular mounting supporting a lens, and a light bulb disposed in the mounting whose center terminal engages the negative pole of the battery cell and whose base terminal is connected to a movable contact such that when the assembly is rotated to a given angular position, the movable contact engages the fixed contact to supply power to the bulb, said bulb being trapped in the assembly whereby to replace the bulb, the assembly is decoupled from the case which remains wedges in the arm; said mounting being provided with an externally-threaded shank, the front end of the case being externally threaded, and a union coupling the shank to the front end of the case.

2. A unit as set forth in claim 1, further including a spiral metal spring at the bottom of the case to bias said battery cell to urge said positive pole into engagement with the center terminal of the bulb, said spring having a wire extension which extends to the front end of the case and forms said fixed contact.

3. A unit as set forth in claim 1, wherein said base terminal of the bulb is clamped by a metal collar having a pair of diametrically-opposed lugs that are received in notches in the shank to define said movable contact.

4. A unit as set forth in claim 1, further including an internally-threaded coupling ring that telescopes in said union and threadably engages the shank to permit rotation of the assembly.

5. A unit as set forth in claim 1, wherein said bulb is provided with a bimetallic interrupter to provide blinking light signals.

6. A unit as set forth in claim 5, wherein said lens is dome-shaped and has a red hue to provide a blinking red light signal.

7. A unit as set forth in claim 5, wherein said lens is dome-shaped and has a green hue to provide a blinking green signal.

* * * * *